United States Patent Office 2,874,121
Patented Feb. 17, 1959

2,874,121

TEREPHTHALATE-THICKENED GREASES

Bruce W. Hotten, Orinda, Calif., assignor to California Research Corporation, San Francisco, Calif., a corporation of Delaware No Drawing. Application October 25, 1954
Serial No. 464,643

11 Claims. (Cl. 252—39)

This application is directed to grease compositions thickened by a class of compounds some members of which can be used in the preparation of grease compositions having low temperature characteristics and other members of which can be used in the preparation of grease compositions having high temperature characteristics.

Also, these new grease-thickening agents form grease compositions which are water resistant, and which are highly resistant to oxidation. It has been a general characterization that metal soap grease-thickening agents act as catalysts for oxidation of grease compositions. However, this usual characteristic is not a property of the class of metal soap grease-thickening agents set forth herein.

The grease compositions of this invention are of particular advantage and are well suited for use in places which are not readily accessible for lubrication. For example, it is desirable to use high temperature oxidation-resistant grease compositions in motors which are lubricated only once during the lifetime of the motor; that is, when the motor is built. These compositions are also used in the proper lubrication of automotive wheel bearings, steel mill equipment, universal joints, rocker arms of airplane motors, jet engines, etc.

Greases are now being manufactured to lubricate effectively under temperatures considerably in excess of 300° F., and, in numerous instances, in the range of 500 to 600° F. and higher. Military and industrial grease specifications describe greases having dropping points of 400° F. as a minimum.

In accordance with the invention set forth herein, it has been discovered that water resistant and oxidation-resistant high temperature grease compositions can be prepared by incorporating metal soaps of terephthalic acid in lubricating oils. In particular, the grease compositions herein contain metal soaps of the monoesters of terephthalic acids as thickening agents.

The grease-thickening agents of this invention form grease compositions which are resistant to oxidation at high temperatures, resistant to emulsification in water, and have low wear characteristics at high temperatures. Thus, by using metal soaps of esters of terephthalic acids as grease-thickening agents, an oxidation-resistant grease can be obtained which is resistant to emulsification in water, and exhibits low wear at high temperatures (e. g., 400° F.).

Various esters of terephthalic acids which can be used in the preparation of the metal salts of this invention include dimethyl terephthalate, diethyl terephthalate, dipropyl terephthalate, dibutyl terephthalate, ditertiarybutyl terephthalate, dipentyl terephthalate, di(2,2-dimethyl propane) terephthalate, di(methylbutyl) terephthalate, di(N-hexyl) terephthalate, diisohexyl terephthalate, di(2,3-dimethylbutyl) terephthalate, diheptyl terephthalate, dioctyl terephthalate, di(2-ethylhexyl) terephthalate, dinonyl terephthalate, didecyl terephthalate, didodecyl terephthalate, ditetradecyl terephthalate, dihexadecyl terephthalate, dioctadecyl terephthalate, dieicosyl terephthalate, didocosyl terephthalate; monomethyl terephthalic acid, monoethyl terephthalic acid, monopropyl terephthalic acid, monobutyl terephthalic acid, monoheptyl terephthalic acid, monopentyl terephthalic acid, monohexyl terephthalic acid, monodecyl terephthalic acid, monododecyl terephthalic acid, monotetradecyl terephthalic acid, monohexadecyl terephthalic acid, monooctadecyl terephthalic acid, monoeicosyl terephthalic acid; mixed esters of terephthalic acid, such as methyl, ethyl terephthalate; methyl, propyl terephthalate; ethyl, decyl terephthalate; methyl, dodecyl terephthalate; propyl, tetradecyl terephthalate; butyl, tetradecyl terephthalate; butyl, hexadecyl terephthalate; butyl, octadecyl terephthalate; butyl eicosyl terephthalate; decyl, tetradecyl terephthalate; and mixtures of these monoesters, diesters, acids, etc.

Metals forming the metal salts of the terephthalic acids and derivatives thereof useful as thickening agents according to this invention are monovalent metals, including the metals of groups I, II, III, and IV of Mendeleeff's Periodic Table, particularly lithium, sodium, potassium, calcium, barium, aluminum, and zinc.

Examples of the metal salt thickening agents of this invention include the following: sodium monomethyl terephthalate, sodium monoethyl terephthalate, sodium monopropyl terephthalate, sodium monoisopropyl terephthalate, sodium mono(n-butyl) terephthalate, sodium monotertiary butyl terephthalate, sodium monopentyl terephthalate, sodium monohexyl terephthalate, sodium monoheptyl terephthalate, sodium monooctyl terephthalate, sodium monoethylhexyl terephthalate, sodium monononyl terephthalate, sodium monodecyl terephthalate, sodium monododecyl terephthalate, sodium monotetradecyl terephthalate, sodium monohexadecyl terephthalate, sodium monooctadecyl terephthalate, sodium monoeicosyl terephthalate; potassium monomethyl terephthalate, potassium monooctyl terephthalate, potassium monodecyl terephthalate, potassium monododecyl terephthalate, potassium monotetradecyl terephthalate, potassium monohexadecyl terephthalate; lithium monomethyl terephthalate, lithium monoethyl terephthalate, lithium monohexyl terephthalate, lithium monooctyl terephthalate, lithium monododecyl terephthalate, lithium monooctadecyl terephthalate, lithium monoeicosyl terephthalate; calcium monomethyl terephthalate, calcium monoethyl terephthalate, calcium monopropyl terephthalate, calcium monoisopropyl terephthalate, calcium mono-N-butyl terephthalate, calcium monotertiarybutyl terephthalate, calcium monopentyl terephthalate, calcium monohexyl terephthalate, calcium monoheptyl terephthalate, calcium monooctyl terephthalate, calcium monoethylhexyl terephthalate, calcium mononoyl terephthalate, calcium monodecyl terephthalate, calcium monododecyl terephthalate, calcium monotetradecyl terephthalate, calcium monohexadecyl terephthalate, calcium monooctadecyl terephthalate, calcium monoeicosyl terephthalate; barium monomethyl terephthalate, barium monoethyl terephthalate, barium monopropyl terephthalate, barium monoisopropyl terephthalate, barium mono-N-butyl terephthalate, barium monotertiarybutyl terephthalate, barium monopentyl terephthalate, barium monohexyl terephthalate, barium monoheptyl terephthalate, barium monooctyl terephthalate, barium monoethylhexyl terephthalate, barium mononoyl terephthalate, barium monodecyl terephthalate, barium monododecyl terephthalate, barium monotetradecyl terephthalate, barium monohexadecyl terephthalate, barium monooctadecyl terephthalate, barium monoeicosyl terephthalate, etc.

In the formation of grease compositions, the lubricating oils which may be used are oils of lubricating viscosity, and include a wide variety of lubricating oils, such as naphthenic base, paraffin base, and mixed base;

other hydrocarbon lubricants, e. g., lubricating oils derived from coal products and synthetic oils, e. g., alkylene polymers, such as polymers of propylene, butylene, etc., and the mixtures thereof; alkylene oxide type polymers, dicarboxylic acid esters, liquid esters of acids of phosphorus, alkylbenzene polymers, polymers of silicon, etc. Synthetic oils of alkylene oxide type polymers which may be used include those which may be exemplified by the alkylene oxide polymers (e. g., propylene oxide polymers) and derivatives, including alkylene oxide polymers prepared by polymerizing the alkylene oxides, e. g., propylene oxide, in the presence of water or alcohols, e. g., ethyl alcohol; esters of propylene oxide type polymers, e. g., acetylated propylene oxide polymers prepared by acetylating propylene oxide polymers containing hydroxyl groups; polyethers prepared from alkylene glycols, e. g., ethylene glycols, etc.

The polymeric products prepared from the various alkylene oxides and alkylene glycols may be polyoxyalkylene diols or polyalkylene glycol derivatives; that is, the terminal hydroxyl groups can remain as such, or one or both of the terminal hydroxyl groups can be removed during the polymerization reaction by esterification or etherification.

Synthetic oils of the dicarboxylic acid ester type include those which are prepared by esterifying such dicarboxylic acids as adipic acid, azaleic acid, sebaric acid, sebacic acid, alkanyl succinic acid, fumaric acid, maleic acid, etc., with alcohols such as butyl alcohol, 2-ethylhexyl alcohol, dodecyl alcohol, etc. Examples of dibasic (dicarboxylic) acid ester synthetic oil include: dibutyl adipate, dihexyl adipate, di-2-ethylhexyl sebacate, di-N-hexyl fumaric polymer. Synthetic oils of the alkylbenzene type include those which are prepared by alkylating benzene (e. g., dodecyl benzene, tetradecyl benzene, etc.).

Synthetic oils of the type of polymers of silicon include the liquid esters of silicic acid the polysiloxanes. The liquid esters of silicic acid and the polysiloxanes include those exemplified by tetraethyl silicate, tetraisopropyl silicate, tetra(methyl-2-butyl) silicate, tetra-(4-methyl-2-penta) silicate, tetra(1-methoxy-2-propyl) silicate, disiloxane, poly (methyl) siloxane, poly(methylphenyl) siloxane, and poly (phenoxy glycols), etc.

Metal salts of monoesters of terephthalic acids containing from 1 to 24 carbon atoms in the ester radical are thickening agents for grease compositions having high melting points and for grease compositions having low melting points. If extremely high melting point (e. g., from about 300° F. to about 600° F. and higher) grease compositions are desired, it is of particular benefit to use terephthalates wherein the ester radical has relatively few carbon atoms; for example, no more than 16 carbon atoms (i. e., from 1 to 16 carbon atoms). On the other hand, if lower melting point (e. g., from about 100° F. to about 300° F.) grease compositions are desired, the ester group on the terephthalate may have no less than 16 carbon atoms and as many as 24 carbon atoms (i. e., from 16 to 24 carbon atoms).

As thickening agents of oils of lubricating viscosity, metal salts of esters of terephthalic acid are used in amounts sufficient to thicken the oils. Amounts from 2% to 50%, by weight (based on the finished composition), can be used. However, it is preferred to use amounts from about 7% to about 25%, by weight.

The thickening agents of this invention are prepared by reacting a diester of terephthalic acid with an amount of a basic substance sufficient to saponify one of the ester groups, using a solvent in which the metal salt of terephthalic acid is insoluble. The diesters of terephthalic acid may have similar or dissimilar ester groups. For example, the diester may be a dimethyl terephthalate; or, on the other hand, the diester may be a monomethyl, monododecyl terephthalate. The examples set forth hereinbelow illustrate the preparation of the grease thickening agents of the present invention.

EXAMPLE 1.—PREPARATION OF MONODODECYL HYDROGEN TEREPHTHALATE

A mixture of 182 grams (0.94 mole) of dimethyl terephthalate and 800 grams (4.3 moles) of n-dodecanol was heated to a temperature to form a molten mixture, which temperature was about 118° C. During a period of three hours, 191 milliliters of a 4.95 N methanol solution of potassium hydroxide (0.94 mole) was added to the above mixture at a temperature ranging from 118° C. to 143° C. During the addition of the potassium hydroxide solution, 235 milliliters of a distillate boiling in the range of 70 to 83° C. was removed, which distillate consisted primarily of methanol.

The mixture was agitated for a period of two hours at temperatures ranging from 163° C. to 209° C. During this period a small amount of distillates was removed between the temperatures of 79 to 89° C. The mixture was then washed four times with ether to remove excess dodecanol, after which the reaction mixture was dissolved in water. The water solution was acidified with excess acetic acid, forming a white precipitate which was washed with water to remove acetic acid and potassium acetate. This white precipitate was dried and recrystallized from hot toluene. The resulting white precipitate had a melting point of 109° C., and the neutralization equivalent was found to be 331 (theoretical value is 334).

EXAMPLE 2.—PREPARATION OF TETRADECYL HYDROGEN TEREPHTHALATE

A mixture of 214 grams of n-tetradecanol (1 mole), 97 grams of dimethyl terephthalate (0.5 mole), and 5 grams of sodium methylate (serving as a catalyst) was heated at 200° C. in a 2-liter resin flask until the evolution of methanol ceased. The resulting bis(tetradecyl) terephthalate was dissolved in 1 liter of toluene, after which 138 milliliters of 3.63 N-methanol solution of potassium hydroxide was added during a period of 2 hours at temperatures ranging from 100 to 117° C. The reaction product was washed with ether to remove any unreacted tetradecanol, after which the product was dissolved in two liters of water containing 10% ethanol. The reaction mixture was acidified with dilute sulfuric acid, forming a white precipitate which was extracted with boiling toluene; and the extract was cooled and filtered to remove the crude tetradecyl hydrogen terephthalate. This product was recrystallized from hot toluene and from ethanol, yielding a product which had a melting point of 114° C. and a neutralization equivalent of 355 (theoretical is 362).

EXAMPLE 3.—PREPARATION OF HEXADECYL HYDROGEN TEREPHTHALATE

A mixture of 242 grams (1 mole) of N-hexadecanol, 97 grams (0.5 mole) of dimethyl terephthalate, and 5 grams of sodium methylate was heated at 200° C. in a 2-liter resin flask until no more methanol was removed by distillation.

The resulting bis(hexadecyl) terephthalate was dissolved in one liter of toluene, after which this solution was reacted with 138 milliliters of 3.63 N-methanol solution of potassium hydroxide, which was added during a period of two hours at temperatures ranging from 100 to 117° C. The product was washed with ether until free of hexadecanol, dissolved in two liters of water containing 10% ethanol, acidified with dilute sulfuric acid, resulting in a white precipitate which was extracted with boiling toluene. The white precipitate obtained after the toluene had cooled was further recrystallized from toluene and ethyl alcohol to yield hexadecyl hydrogen terephthalate having a neutralization equivalent of 395 (calculated 390).

EXAMPLE 4.—PREPARATION OF OCTADECYL HYDROGEN TEREPHTHALATE

A mixture of 540 grams (2 moles) of N-octadecanol, 194 grams (1 mole) of dimethyl terephthalate, and 10 grams of sodium methylate was heated at 200° C. in a 2-liter resin flask until the evolution of ethanol by distillation ceased.

The resulting bis(octadecyl) terephthalate was dissolved in one liter of toluene and 138 milliliters of 3.63 N-potassium hydroxide in methanol was added during the period of two hours at 100 to 117° C. The resulting product was washed with ether until it was free of octadecanol, after which it was dissolved in two liters of water containing 10% ethanol, acidified with dilute sulfuric acid, forming a white precipitate which was extracted with boiling toluene. The white crystals resulting from the cooled and filtered toluene were recrystallized from hot toluene and from ethyl alcohol to yield the octadecyl hydrogen terephthalate having a melting point of 110° C.

The examples hereinbelow illustrate the preparation of greases from soaps of acids set forth hereinabove.

EXAMPLE 5.—GREASE THICKENED WITH SODIUM DODECYL TEREPHTHALATE

A mixture of 14.1 grams of the dodecyl hydrogen terephthalate of Example 1 hereinabove, 1.7 grams of sodium hydroxide in a small amount of water, and 85 grams of a California solvent-refined paraffin base oil having a viscosity of 450 SSU at 100° F. was heated to 220° F. until the acid had been neutralized and the water removed, then heated to a temperature of 520° F. After the dispersion of soap in oil had cooled to ambient temperatures, the resulting grease had an ASTM dropping point of 500+° F. and an ASTM penetration of 342 after 60 strokes in the ASTM worker.

EXAMPLE 6.—GREASE THICKENED WITH SODIUM METHYL TEREPHTHALATE

A grease thickened with sodium salt of monomethyl terephthalic acid (15% by weight) was prepared by reacting sodium hydroxide with dimethyl terephthalate in benzene to form the sodium monomethyl terephthalate gel. This resulting gel was mixed with a California solvent-refined paraffin base oil having a viscosity of 450 SSU at 100° F. The benzene and methyl alcohol were evaporated off, leaving a smooth grease. This grease had an ASTM dropping point of 500+° F. and an ASTM work peneration of about 300 after 60 strokes in the ASTM worker at 77° F.

EXAMPLE 7.—GREASE THICKENED WITH BARIUM OCTADECYL TEREPHTHALATE

A grease thickened with the barium salt of octadecyl hydrogen terephthalate was prepared by heating a mixture consisting of 4.5 grams of octadecyl hydrogen terephthalate, 1.39 grams of barium hydroxide octahydrate, and 28 grams of a California solvent-refined paraffin base mineral oil having a viscosity of 450 SSU at 100° F. to a temperature of 400° F. The oil solution was cooled, and the resulting grease was milled. The grease had an ASTM worked penetration (77° F.) of 287. The melting point was 220° F.

The table hereinbelow presents data on further grease compositions prepared from esters of terephthalic acids.

The water resistance test data were obtained by making a ball of grease of 5±0.02 grams weight, then immersing the ball in boiling distilled water for one hour. The observed weight of the ball at the end of the one hour test period was noted, and the percent remaining was recorded.

Table I

| Sample No. | Terephthalate thickener used | Amt. of thickener, percent by weight | Grease properties | | |
|---|---|---|---|---|---|
| | | | ASTM dropping point, ° F. | ASTM worked penetration, 60 strokes at 77° F. | Percent grease remaining after boiling water test |
| 1 | Sodium dodecyl[a] | 15 | 500+ | 342 | 80 |
| 2 | Sodium tetradecyl[b] | 15 | 450 | 319 | |
| 3 | Sodium hexadecyl[c] | 15 | 322 | 353 | |
| 4 | Sodium hexadecyl (76%) plus sodium methyl (24%) | 15 | 415 | 278 | |
| 5 | Sodium octadecyl[d] | 14 | 360 | 282 | 60 |

[a] From Example 1 hereinabove.
[b] From Example 2 hereinabove.
[c] From Example 3 hereinabove.
[d] From Example 4 hereinabove.

In addition to the base oils and the thickening agents, the grease composition of this invention may also include stringiness agents, oxidation inhibitors, antiwear agents, extreme pressure agents, fillers, etc.

I claim:

1. A grease composition comprising a major proportion of an oil of lubricating viscosity and a metal salt of a monoester of terephthalic acid containing from 1 to 24 carbon atoms in the ester group, wherein said metal is selected from the group consisting of alkali metals and alkaline earth metals and said metal salt is present in an amount sufficient to thicken said lubricating oil to the consistency of a grease.

2. A grease composition comprising a major proportion of an oil of lubricating viscosity, and a metal salt of an ester of terephthalic acid, wherein said ester group contains from 16 to 24 carbon atoms, and wherein said metal is a metal selected from the group consisting of alkali metals and alkaline earth metals.

3. A grease composition comprising a major proportion of an oil of lubricating viscosity and from 2% to 50% of a metal salt of a monoester of terephthalic acid containing from 1 to 24 carbon atoms in the ester group, said metal being selected from the group consisting of the alkali metal and alkaline earth metals.

4. A grease composition comprising a major proportion of an oil of lubricating viscosity and from 2% to 50% of a metal salt of a monoester of terephthalic acid containing from 1 to 16 carbon atoms in the ester group, and wherein said metal is a metal selected from the group consisting of alkali metals and alkaline earth metals.

5. A grease composition comprising a major proportion of an oil of lubricating viscosity and from 7% to 25% of a metal salt of a monoester of terephthalic acid containing from 16 to 24 carbon atoms in the ester group, said metal being selected from the group consisting of the alkali metal and alkaline earth metals.

6. A grease composition comprising a major proportion of an oil of lubricating viscosity and from 7% to 25% of an alkaline earth metal salt of a monoester of terephthalic acid containing from 1 to 24 carbon atoms in the ester group.

7. The grease composition of claim 6, wherein said alkaline earth metal is barium.

8. A grease composition comprising a major proportion of an oil of lubricating viscosity and from 7% to 25% of an alkali metal salt of a monoester of terephthalic acid containing from 1 to 24 carbon atoms in the ester group.

9. The grease composition of claim 8, wherein said alkali metal is sodium.

10. A grease composition comprising a major proportion of an oil of lubricating viscosity, and from 7% to 25%, by weight, of sodium dodecyl terephthalate.

11. A grease composition comprising a major proportion of an oil of lubricating viscosity and from 7% to 25%, by weight, of barium octadecyl terephthalate.

References Cited in the file of this patent

UNITED STATES PATENTS

| | | |
|---|---|---|
| 2,049,072 | Mikeska et al. | July 28, 1936 |
| 2,186,346 | Ricketts | Jan. 9, 1940 |
| 2,223,129 | Prutton | Nov. 26, 1940 |
| 2,223,130 | Prutton | Nov. 26, 1940 |
| 2,661,296 | Schurmier et al. | Dec. 1, 1953 |

FOREIGN PATENTS

| | | |
|---|---|---|
| 893,973 | France | Mar. 6, 1944 |